United States Patent [19]

Iwata

[11] Patent Number: 4,987,771
[45] Date of Patent: Jan. 29, 1991

[54] MISFIRE DETECTION DEVICE FOR AN INTERNAL COMBUSTION ENGINE

[75] Inventor: Toshio Iwata, Himeji, Japan

[73] Assignee: Mitsubishi Denki Kabushiki Kaisha, Tokyo, Japan

[21] Appl. No.: 414,360

[22] Filed: Sep. 29, 1989

[30] Foreign Application Priority Data

Oct. 13, 1988 [JP] Japan .................. 63-255832

[51] Int. Cl.$^5$ .......................... G01M 15/00
[52] U.S. Cl. ................................. 73/117.3
[58] Field of Search ............ 73/116, 118.1, 117.3; 123/406, 198 DB

[56] References Cited

U.S. PATENT DOCUMENTS

| | | | |
|---|---|---|---|
| 3,908,366 | 9/1975 | Masaki | 73/117.3 |
| 3,924,457 | 12/1975 | Oshima et al. | 73/116 |
| 4,003,248 | 1/1977 | Leichle | 73/116 |
| 4,425,891 | 1/1984 | Kashimura et al. | 123/425 |
| 4,886,029 | 12/1989 | Lill et al. | 73/117.3 |

FOREIGN PATENT DOCUMENTS

| | | |
|---|---|---|
| 2507286 | 8/1975 | Fed. Rep. of Germany . |
| 2520325 | 11/1975 | Fed. Rep. of Germany . |
| 5397120 | 8/1978 | Japan . |
| 0022033 | 2/1979 | Japan ................. 73/116 |

Primary Examiner—Robert Raevis
Attorney, Agent, or Firm—Sughrue, Mion, Zinn, Macpeak & Seas

[57] ABSTRACT

A misfire detection device for an internal combustion engine comprises an ionic current detection circuit which detects an ionic current caused by ignition occurring at an ignition plug for a cylinder in a multi-cylinder internal combustion engine, a gate circuit which masks an output signal generated from the ionic current detection circuit only during an ignition sparking time, a comparing circuit which compares an ionic current signal passed through the gate circuit with a predetermined level, and a misfire detection circuit which detects the presence or the absence of a misfire and a misfired cylinder based on the output signal of the comparing circuit. The future supply of fuel to a misfired cylinder is controlled by a fuel supply control device.

8 Claims, 3 Drawing Sheets

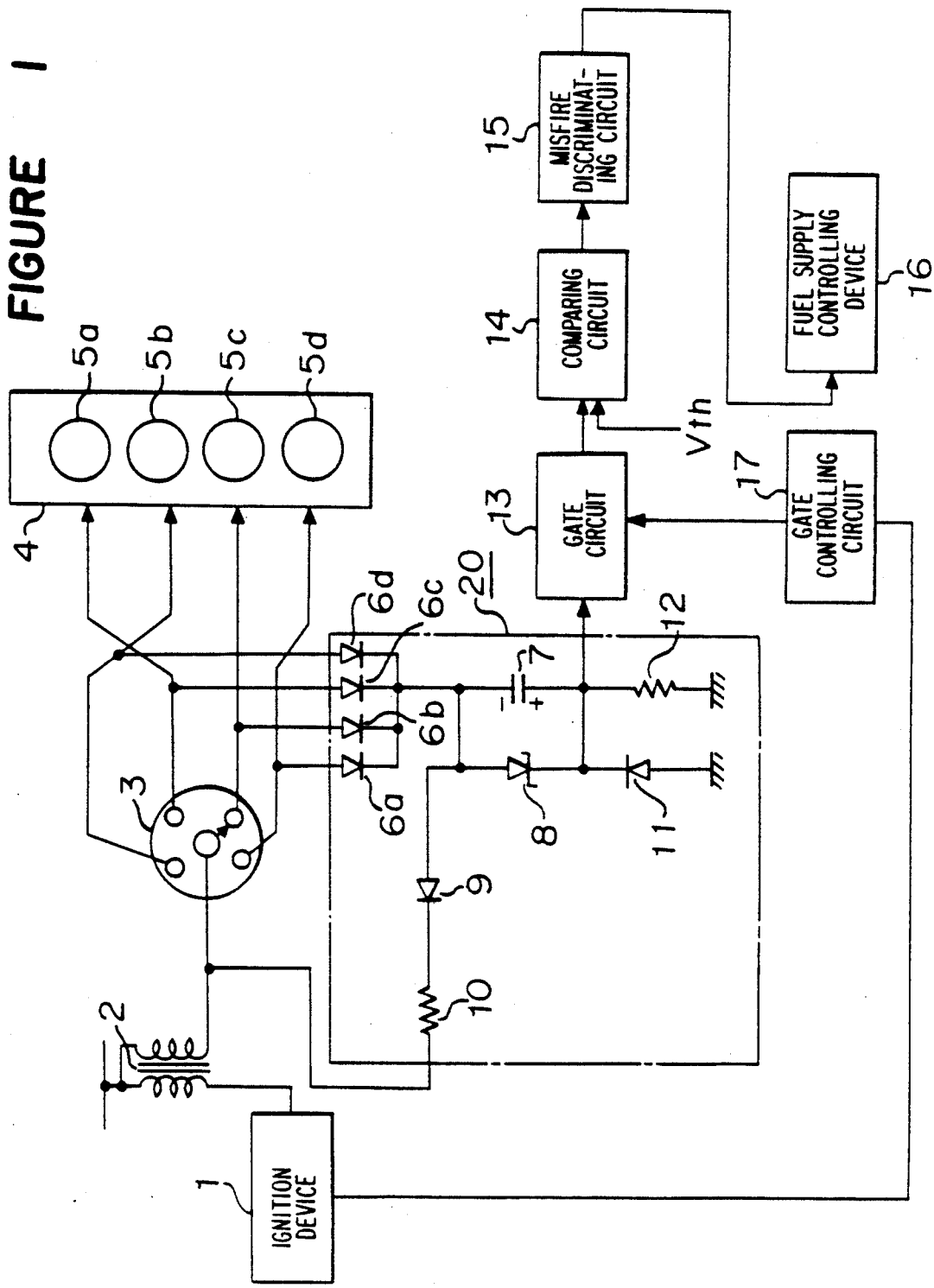

4,987,771

MISFIRE DETECTION DEVICE FOR AN INTERNAL COMBUSTION ENGINE

BACKGROUND OF THE INVENTION

1. Field of the Invention

The present invention relates to a misfire detection device for an internal combustion engine. More particularly, it relates to a misfire detection device for an internal combustion engine for detecting misfire in a multi-cylinder type internal combustion engine by detecting an ionic current caused by ignition at an ignition plug for a cylinder.

2. Discussion of Background

FIG. 5 is a block diagram showing a conventional ignition system in a four cylinder type internal combustion engine. In FIG. 5, a reference numeral 1 designates an ignition device and a numeral 2 designates an ignition coil having a primary winding connected to the ignition device 1 and a secondary winding connected to a distributor 3 which will be described hereinafter.

The distributor 3 has a plurality of circumferential electrodes each being connected to each cylinder block 5a, 5b, 5c or 5d of an internal combustion engine 4. In the ignition system of the conventional internal combustion engine having the construction described above, when a current is intermittently fed to the primary side of the ignition coil 2 by means of the ignition device 1, a high voltage having a negative polarity is produced at the secondary side of the ignition coil 2. The high voltage is distributed to the ignition plug (not shown) of each of the cylinders by the distributor 3. Then, sparking is caused at the electrode of the ignition plug whereby firing and explosion of a gas mixture successively occur to actuate the engine 4.

In the conventional ignition system of the internal combustion engine, however, there was a problem that when a misfire happened, the fuel which had not been burnt flowed from a misfired cylinder to an exhaust gas purifying device to thereby deteriorate or damage a catalyst because the conventional ignition system had no misfire detection device for detecting misfire at a cylinder.

SUMMARY OF THE INVENTION

It is an object of the present invention to provide a misfire detection device for an internal combustion engine capable of detecting the misfire of fuel and of stopping the supply of fuel to a misfired cylinder.

The foregoing and other objects of the present invention have been attained by providing a misfire detection device for an internal combustion engine which comprises an ionic current detection means to detect an ionic current caused by ignition at an ignition plug for a cylinder in a multi-cylinder internal combustion engine, a gate means to mask an output signal generated from the ionic current detection means only during an ignition sparking time, a comparing means to compare a signal of ionic current passed through the gate means with a predetermined level, and a misfire detection means to detect the presence or the absence of misfire and a misfired cylinder based on an output signal of the comparing means.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 1 is a diagram of an embodiment of the misfire detection device for an internal combustion engine according to the present invention;

DETAILED DESCRIPTION OF PREFERRED EMBODIMENT

Figure 3:
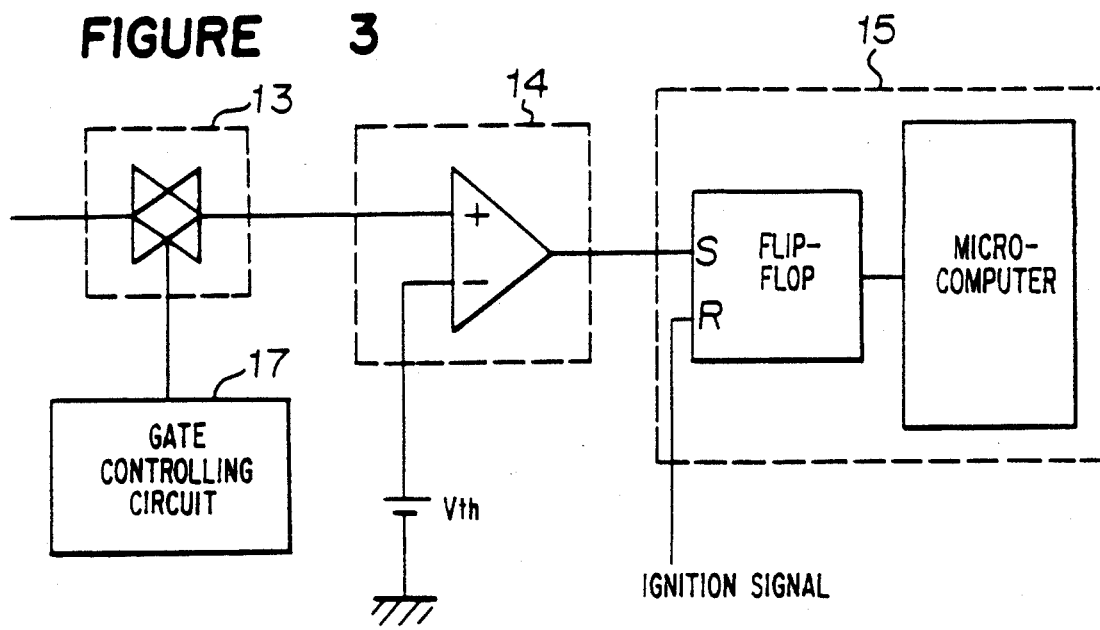
FIG. 3 is a block diagram showing in more detail a part of the misfire detection circuit as shown in FIG. 1.

Referring to the drawings, wherein the same reference numerals designate the same or corresponding parts throughout the several views, and more particularly to FIG. 1 thereof, there is shown a diagram of a typical example of the misfire detection device for an internal combustion engine of the present invention. In FIG. 1, numerals 1, 2, 3, 4 and 5a through 5d designate the same elements as the conventional device.

Numerals 6a to 6d respectively designate diodes for passing an ionic current flowing at each of the ignition plugs of the cylinders to an ionic current detection device 20 which will be described hereinafter. A numeral 7 designates a capacitor having its positive pole connected to the ground through a resistor 12 and its negative pole connected to a common connecting point to the cathode of each of the diodes. A numeral 8 designates a constant-voltage diode having its anode connected to the anode of a diode 9 as well as the negative pole of the capacitor 7 and having its cathode connected to the cathode of a diode 11 whose anode is grounded as well as the positive pole of the capacitor 7. A numeral 10 designates a resistor one end of which is connected to the secondary side of the ignition coil 2 and the other end of which is connected to the cathode of the diode 9. Thus, the ionic current detection device 20 is constituted by the above-mentioned structural elements.

A numeral 13 designates a gate circuit which has an input terminal connected to a connecting point between the cathode of the constant-voltage diode 8 and the cathode of the diode 11 and to a connecting point between the positive pole of the capacitor 7 and a terminal of the resistor 12. The gate circuit 13 has another input terminal connected to the ignition device 1 through a gate controlling circuit 17.

A numeral 14 designates a comparing circuit adapted to compare an output signal from the gate circuit 13 with a predetermined signal Vth. A numeral 15 designates a misfire discriminating circuit having its input terminal connected to the output terminal of the comparing circuit 14 and its output terminal connected to a fuel supply controlling device 16.

FIG. 3 shows the construction of the gate circuit 13, the comparing circuit 14 and the misfire discriminating circuit 15 in more detail. The gate circuit 13 is constituted by an analog switch element having a control terminal which is connected to the gate controlling circuit 17. The comparing circuit 14 is constituted by a comparator having a positive terminal connected to the analog switch element and a negative terminal connected to the ground through a battery having a voltage corresponding to the predetermined signal value Vth for comparison. The misfire discriminating circuit 15 is constituted by a serial connection of a flip-flop and a microcomputer so that the output signal of the comparator 14 is input to the flip-flop and a signal indicating a normal state in the engine or a misfiring state is input to the microcomputer at each igniting time. In this case, when a pulse signal is produced from the comparator, it indicates the normal state and when no pulse signal is produced, it indicates the misfiring state.

Figure 2:
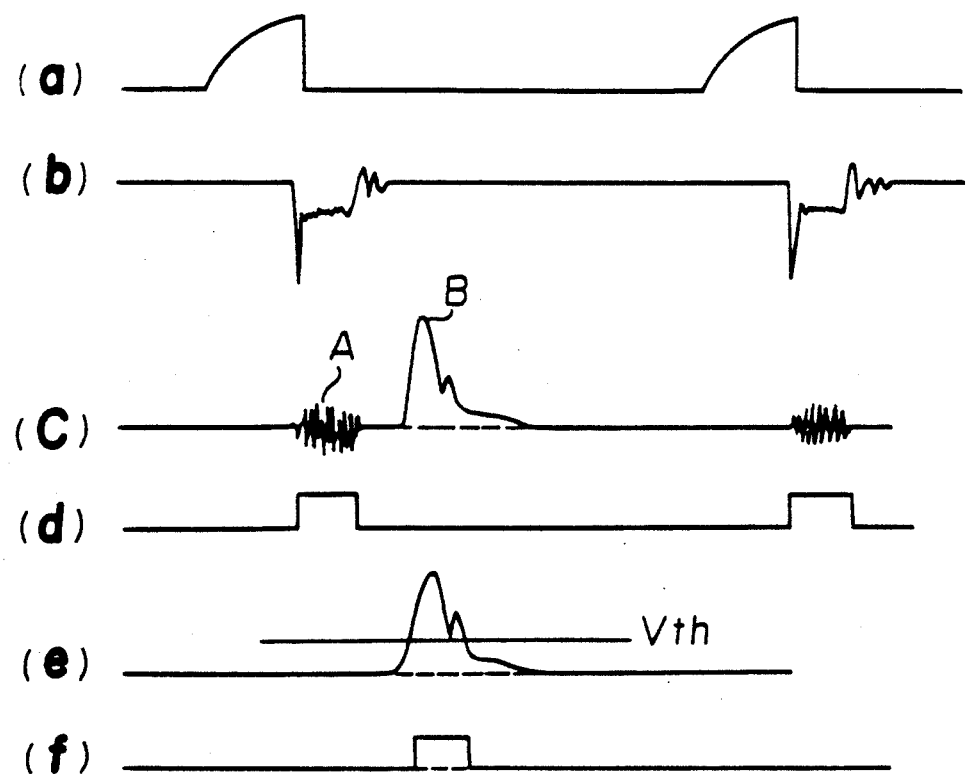
FIG. 2 is a diagram showing the waveform of signals appearing at important structural elements in the apparatus shown in FIG. 1.
Figure 5:
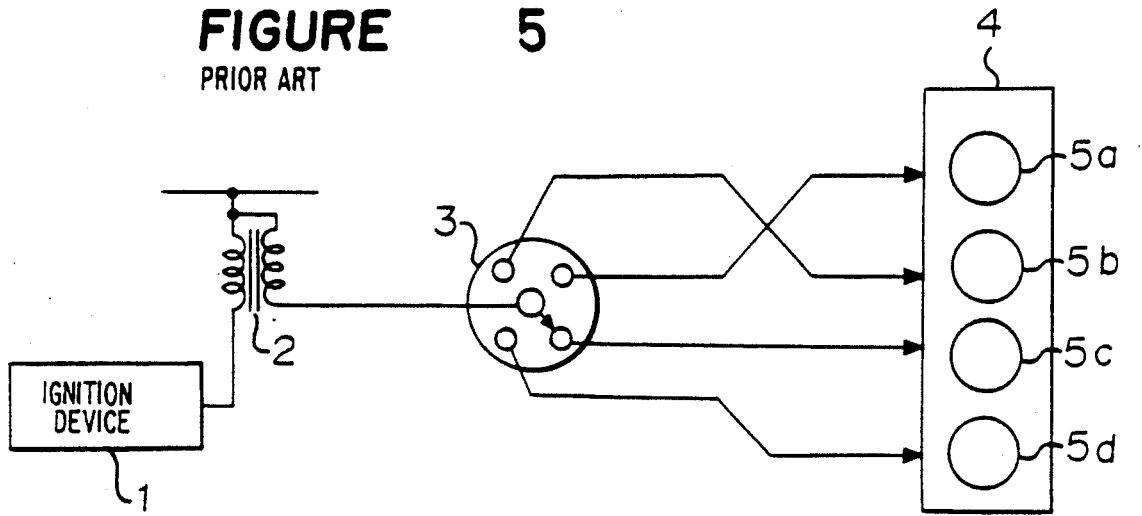
FIG. 5 is a block diagram showing a conventional ignition system of an internal combustion engine.

In the misfire detection device for an internal combustion engine having the construction as above-mentioned, when a current as shown in FIG. 2a is intermittently supplied to the primary winding side of the ignition coil 2 by means of the ignition device 1, a waveform of voltage as shown in FIG. 2b is obtained at the secondary winding side of the ignition coil 2. The high voltage is distributed to each of the cylinders by the distributor 3, whereby the ignition of the engine 4 is performed at the ignition plug (not shown) of a cylinder. Further, the high voltage charges the capacitor 7 through the resistor 10 and the diodes 9, 11 wherein the capacitor 7 is charged to a predetermined level of voltage due to the presence of the constant-voltage diode 8. When the engine 4 is not in a state of combustion after the ignition, no current is passed through the resistor 12. However, when the engine 4 is in a state of combustion, the concentration of gas ions at the air gap of the ignition plug increases, and an ionic current flows in a closed circuit comprising one of the ignition plugs for the cylinders, one of the diodes 6a to 6d, the capacitor 7 and the resistor 12, whereby the ionic current as shown in FIG. 2c is supplied to the gate circuit 13. Since noise components A as shown in FIG. 2c are masked by the output signal (FIG. 2d) of the gate controlling circuit 17, a signal indicated by a symbol B in FIG. 2c is input in the comparing circuit 14 at which comparison of the signal B with a predetermined value Vth is made (FIG. 2e), whereby an output pulse as shown in FIG. 2f is produced. The output pulse generated from the comparing circuit 14 shows that the engine 4 is in a state of combustion. Accordingly, a judgement that there is no misfire in the engine is made by the misfire discriminating circuit 15 and the fuel supply control device 16 is not operated. When the output pulse (FIG. 2f) is not produced, it shows that the engine 4 is not in a state of combustion, and the misfire discriminating circuit 15 judges that there is misfiring in the engine.

Since the ionic current detection device 20 detects an ionic current at the ignition plug of one of the cylinders, it can discriminate which cylinder causes misfiring when the misfire discrimination circuit 15 discriminates the presence of misfiring. Accordingly, fuel supply to the misfired cylinder is controlled (for example, by stopping the supply of fuel to the misfired cylinder) by the fuel supply control device 16.

Figure 4:
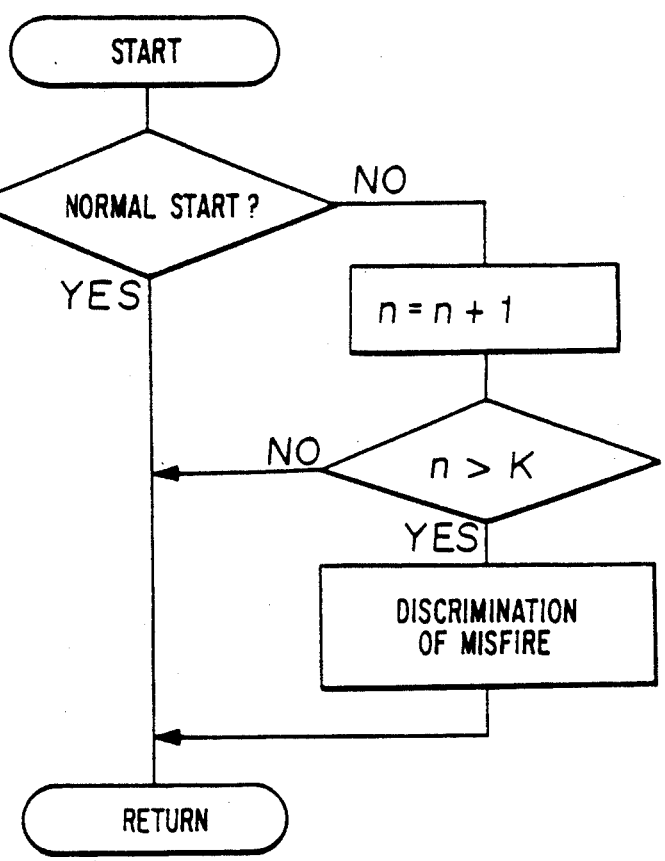
FIG. 4 is a diagram for discriminating a misfire in an engine.

FIG. 4 shows an example of the routine of discriminating a misfire in the engine executed by the microcomputer at every time of ignition. In FIG. 4, a symbol n represents a counter to be reset at each predetermined number of ignitions and a symbol k represents a predetermined value for discriminating the misfire.

Thus, in the misfire detection device having the above-mentioned construction, fuel supply to a misfired cylinder can be controlled on the basis of the output of the misfire detection circuit. Accordingly, deterioration or a damage of a catalyst in an exhaust gas purifying device caused by fuel which has not been burnt can be prevented.

Obviously, numerous modifications and variations of the present invention are possible in light of the above teachings. It is therefore to be understood that within the scope of the appended claims, the invention may be practiced otherwise than as specifically described herein.

What is claimed is:

1. A misfire detection device for an internal combustion engine having an ignition coil and a plurality of cylinders, each of said cylinders having a respective ignition plug, said misfire detection device comprising:
    an ionic current detection means to detect an ionic current which is caused by combustion and occurs at the respective ignition plug of at least one of said plurality of cylinders and to generate an output signal which represents said detected ionic current, said ionic current detection means comprising a capacitor to be charged by a current flowing through a secondary winding of said ignition coil, wherein said ionic current caused by combustion flows through said capacitor and a resistor of said ionic current detection means;
    a gate means to mask said output signal generated from said ionic current detection means only during an ignition sparking time period;
    a comparing means to compare said masked output signal passed through said gate means with a predetermined level and to provide a comparison output signal;
    a misfire detection means to detect the presence or the absence of a misfire and a misfired cylinder based on the comparison output signal; and
    fuel supply controlling means to control supply of fuel to said misfired cylinder in response to an output of said misfire detection means.

2. The misfire detection device according to claim 1, wherein said current flowing through said ignition coil flows through the secondary winding of said ignition coil.

3. The misfire detection device according to claim 1, wherein said fuel supply controlling means stops said supply of fuel to said misfired cylinder.

4. The misfire detection device according to claim 1, wherein said output signal generated by said ionic current detection means corresponds to a voltage at a connection point between said capacitor and said resistor.

5. The misfire detection device according to claim 1, wherein said capacitor is charged to a predetermined voltage level by said current flowing through the secondary winding of said ignition coil.

6. The misfire detection device according to claim 1, wherein no current flows through said resistor unless said engine is in a state of combustion after ignition.

7. The misfire detection device according to claim 1, wherein said ignition sparking time period corresponds to a period of time during which noise may occur in said output signal generated by said ionic current detection means due to a high voltage being distributed to one of said ignition plugs during said ignition sparking time period.

8. The misfire detection device according to claim 1, wherein said ionic current is detected due to a concentration of gas ions at an air gap of said respective ignition plug of at least one of said plurality of cylinders.

* * * * *